Aug. 21, 1928.
V. S. WATERS
MINNOW
Filed Oct. 3, 1927
1,681,316
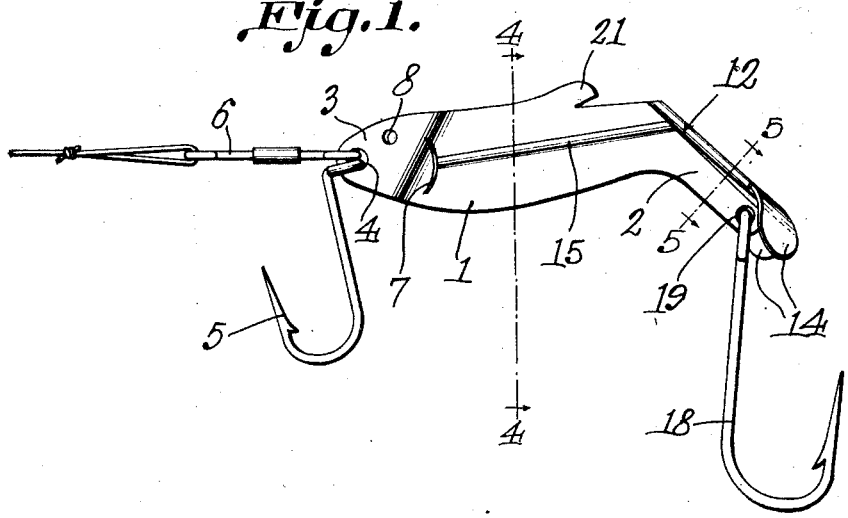
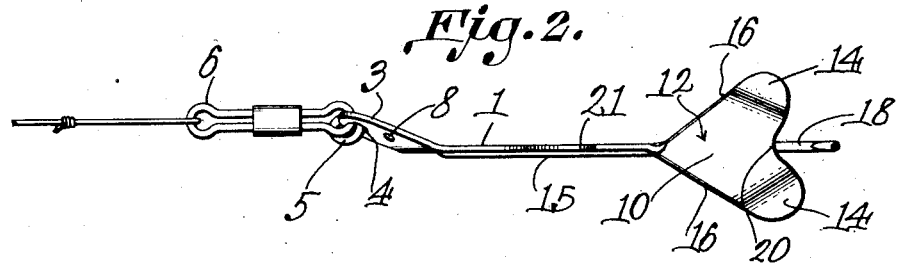
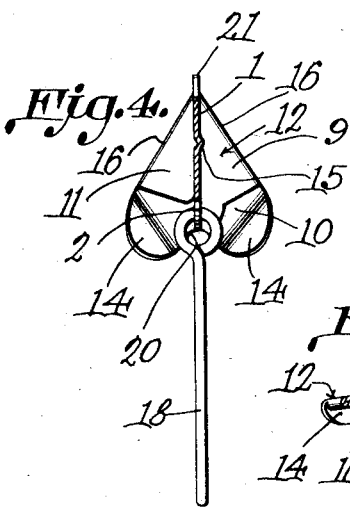
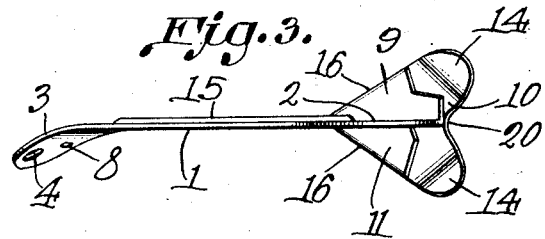
Vance S. Waters Inventor
By C. A. Snow & Co.
Attorneys Patented Aug. 21, 1928.

1,681,316

UNITED STATES PATENT OFFICE.

VANCE SYLVIAN WATERS, OF SEATTLE, WASHINGTON.

MINNOW.

Application filed October 3, 1927. Serial No. 223,699.

This invention aims to provide an artificial bait which may be made cheaply out of plate stock, and be practically indestructible, novel means being provided whereby the bait will be caused to assume and travel an irregular path when it is towed through the water, the bait, thus, simulating the movements of a swimming fish or wiggling minnow.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in side elevation, a device constructed in accordance with the invention, parts being broken away, so far as the fish-line is concerned;

Figure 2 is a top plan;

Figure 3 is a bottom plan wherein divers parts have been removed;

Figure 4 is a cross section on the line 4—4 of Figure 1; and

Figure 5 is a cross section on the line 5—5 of Figure 1.

The bait forming the subject matter of this application preferably is made of metal throughout. It includes a plate-like body 1, shaped in a general way to represent the appearance of a fish. The body 1 has a depending tail 2. The forward end 3 of the body 1 has a pronounced lateral inclination in a single direction. An opening 4 is fashioned in the forward end 3 of the body 1 and in this opening, a hook 5 is pivotally suspended, the opening, moreover receiving the means 6, of whatsoever kind, whereby the bait is towed through the water. The body 1 is supplied with an upstanding dorsal fin 21, and gills are marked on the body or placed thereon otherwise, the gills being designated by the numeral 7. The forward end 3 of the body has an opening 8 which simulates the eye of a fish.

The rear portion of the body 1 and of the tail 2 are laterally bent in one direction, as shown at 9 in Figure 5, and then the material is laterally bent in an opposite direction, as shown at 10, across the end of the body 1 and across the tail 2, and, finally, the material is laterally bent in the first-specified direction, as shown at 11, into contact with the tail 2 and the body 1, the resulting structure being a transverse extension which is marked by the numeral 12. A reinforcing rib 15 extends lengthwise of the body from a point adjacent the gills 7 to the extension 12. The lowest corners of the extension 12 are downwardly and forwardly inclined, as shown at 14. In top plan, the extension 12 tapers as it extends forwardly, as shown at 16, especially in Figures 2 and 4 of the drawings. The extension 12 is disposed at an obtuse angle with respect to the plane defined by the body 1. This construction is shown best in Figure 5 of the drawings, and there is indicated by the reference numeral 17. A hook 18 is pivotally mounted in an opening 19 formed in the rear portion of the body 1, to wit, in the tail 2, and a notch 20 is fashioned in the rear edge of the extension 12, the notch 20 serving as a seat wherein the hook 18 is received when the hook trails after the body 1, as the bait is drawn through the water by the means indicated at 6.

Owing to the fact that the body 1 has a forward end 3 which is inclined laterally in a single direction, the bait is given an irregular swimming motion, as it moves through the water. This motion is enhanced, and is rendered more life-like, moreover, by reason of the fact that the angle shown at 17 in Figure 5 between the extension 12 and the body 1, is not a right angle. The forwardly, downwardly and outwardly inclined corners 14 also aid in giving the bait a lifelike motion. The inclined extension 12 strengthens the tail 2 and prevents the tail from bending, especial attention being directed to the structure shown at 11—10—9 in Figure 5. Moreover, owing to the inclination and the lateral extent of the member 12, it has a tendency to raise the bait slightly, as the bait is towed along, and, even though the bait is not towed along at a high rate of speed, the bait will not tend to dive down into the weeds at the bottom. The rib 15, of course, strengthens the body 1 and enables the body to be made out of lighter stock than would be possible otherwise. When the device is in use, and as the bait trails along through the water, with the shank of the hook 18 in the seat or notch 20, the point of the hook 18 extends upwardly and forwardly, and the hook 18 will not be likely to foul with weeds.

The device forming the subject matter of this application is so constructed that it will constitute a simple, inexpensive, durable and attractive lure.

What is claimed is:—

1. An artificial bait comprising a plate-like body having a depending tail provided with a transverse extension which is upwardly and forwardly inclined, the extension being located partly on each side of the tail and having its lower corners downwardly and forwardly inclined.

2. An artificial bait comprising a plate-like body provided with a transverse extension which is upwardly and forwardly inclined, the extension being located partly on each side of the body, and a hook pivoted to the rear portion of the body, the lower rear edge of the extension having a notch which constitutes a seat wherein the hook is received when the hook trails after the body.

3. An artificial bait comprising a plate-like body provided with a transverse extension which is upwardly and forwardly inclined, the extension being located partly on each side of the body, the extension being located in a plane at an obtuse angle with respect to the plane defined by the body.

4. A artificial bait comprising a plate-like body having a depending tail provided with a transverse extension which is upwardly and forwardly inclined, the extension being located partly on each side of the tail and having its lower corners downwardly and forwardly inclined, the extension being located in a plane which defines an obtuse angle with respect to the plane defined by the body.

5. An artificial bait comprising a plate-like body provided at its rear end with an extension which is upwardly and forwardly inclined, the extension being located partly on each side of the body, the extension being disposed in a plane at an obtuse angle to the plane defined by the body, the forward end of the body having a pronounced lateral inclination in a single direction.

In testimony that I claim the foregoing as my own, I have hereto affixed my signature.

VANCE SYLVIAN WATERS.